United States Patent
Schmidt et al.

(10) Patent No.: US 9,350,445 B1
(45) Date of Patent: *May 24, 2016

(54) METHOD AND APPARATUS FOR DETECTION AND CORRECTION OF CHANNEL FAILURE IN AN OPTICAL TRANSCEIVER SYSTEM

(71) Applicant: Juniper Networks, Inc., Sunnyvale, CA (US)

(72) Inventors: Theodore J. Schmidt, Gilroy, CA (US); Pradeep Sindhu, Los Altos Hills, CA (US); George R. Sosnowski, Sunnyvale, CA (US); Christian Malouin, San Jose, CA (US); Roberto Marcoccia, San Jose, CA (US); Valery Kugel, Sunnyvale, CA (US); Gunes Aybay, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,168

(22) Filed: Aug. 24, 2015

Related U.S. Application Data

(63) Continuation of application No. 14/042,068, filed on Sep. 30, 2013, now Pat. No. 9,118,411.

(51) Int. Cl.
*G02F 1/00* (2006.01)
*H04B 10/035* (2013.01)

(52) U.S. Cl.
CPC .................................. *H04B 10/035* (2013.01)

(58) Field of Classification Search
CPC ...... H04B 10/032; H04B 10/40; H04B 10/43; H04B 10/50; H04B 10/60; H04B 10/035; H04B 10/038

USPC ......... 398/1, 2, 3, 4, 5, 7, 8, 9, 10, 13, 17, 22, 398/23, 24, 91, 33, 38, 45, 48, 49, 79, 82, 398/85, 87, 182, 183, 135, 136, 137, 138, 398/139, 202, 208, 209, 200, 201; 385/24, 385/37, 16, 17, 18

See application file for complete search history.

(56) References Cited

U.S. PATENT DOCUMENTS

| | | | | |
|---|---|---|---|---|
| 5,777,761 | A | 7/1998 | Fee | |
| 6,172,782 | B1 | 1/2001 | Kobayashi | |
| 7,233,738 | B2* | 6/2007 | Kerfoot, III | H04J 14/029 398/10 |
| 7,426,346 | B2 | 9/2008 | Wang et al. | |
| 8,693,864 | B2* | 4/2014 | Kubo | H04B 1/74 398/7 |
| 9,118,411 | B1* | 8/2015 | Schmidt | H04B 10/032 |

* cited by examiner

*Primary Examiner* — Hanh Phan
(74) *Attorney, Agent, or Firm* — Cooley LLP

(57) ABSTRACT

In some embodiments, an apparatus includes an optical transceiver system that includes a set of optical transmitters and a backup optical transmitter. In such embodiments, each optical transmitter from the set of optical transmitter can transmit at a unique wavelength from a set of wavelengths. The backup optical transmitter can transmit at a wavelength from the set of wavelengths when an optical transmitter from the set of optical transmitters associated with that wavelength fails. In other embodiments, an apparatus includes an optical transceiver system that includes a set of optical receivers and a backup optical receiver. The backup optical receiver can receive at a wavelength from the set of wavelengths when an optical receiver from the set of optical receivers associated with that wavelength fails.

24 Claims, 5 Drawing Sheets

METHOD AND APPARATUS FOR DETECTION AND CORRECTION OF CHANNEL FAILURE IN AN OPTICAL TRANSCEIVER SYSTEM

CROSS REFERENCE TO RELATED APPLICATION

This application is a continuation of U.S. patent application Ser. No. 14/042,068, entitled "Method and Apparatus for Detection and Correction of Channel Failure in an Optical Transceiver System," filed Sep. 30, 2013, which is incorporated herein by reference in its entirety.

BACKGROUND

Some embodiments described herein relate generally to the detection and correction of channel failure in an optical transceiver system. In particular, but not by way of limitation, some of the embodiments described herein relate to methods and apparatus for the detection and correction of channel failure in an optical transceiver system used in wavelength division multiplexed (WDM) systems.

Optical transceivers used in WDM systems transmit and receive data by combining a number of different optical channels or signals at different wavelengths onto a single optical fiber or a set of optical fibers. Each wavelength can be associated with a different WDM channel. Light for these WDM channels can be modulated to produce optical signals at different wavelengths to carry data separately. To achieve a sufficiently high data throughput rate, the number of optical WDM channels in optical transceivers can be increased.

A challenge for such optical transceivers with a high number of channels is channel reliability because the probability of a channel failure within such optical transceivers increases with the number of channels for each optical transceiver. Channel failure disrupts the WDM system because the optical transceiver having the failed channel cannot transmit or receive data while the failed channel is out of service or being repaired. In some instances, the entire optical transceiver may need to be replaced. The increased probability of channel failure is particularly problematic with board-mounted optical transceivers, where replacement of board-mounted optical transceivers typically involves factory rework.

Accordingly, a need exists for methods and apparatus for the detection and correction of channel failure in an optical transceiver that does not involve replacement of the optical transceiver.

SUMMARY

In some embodiments, each optical transmitter from a set of optical transmitter can transmit at a unique wavelength from a set of wavelengths. In such embodiments, a backup optical transmitter can transmit at any wavelength from the set of wavelengths. The backup optical transmitter can transmit at a wavelength from the set of wavelengths when an optical transmitter from the set of optical transmitters associated with that wavelength fails.

In some embodiments, each optical receiver from a set of optical receivers can receive at a unique wavelength from the set of wavelengths. In such embodiments, a backup optical receiver can receive at any wavelength from the set of wavelengths. The backup optical receiver can receive at a wavelength from the set of wavelengths when an optical receiver from the set of optical receivers associated with that wavelength fails.

DETAILED DESCRIPTION

Figure 1:
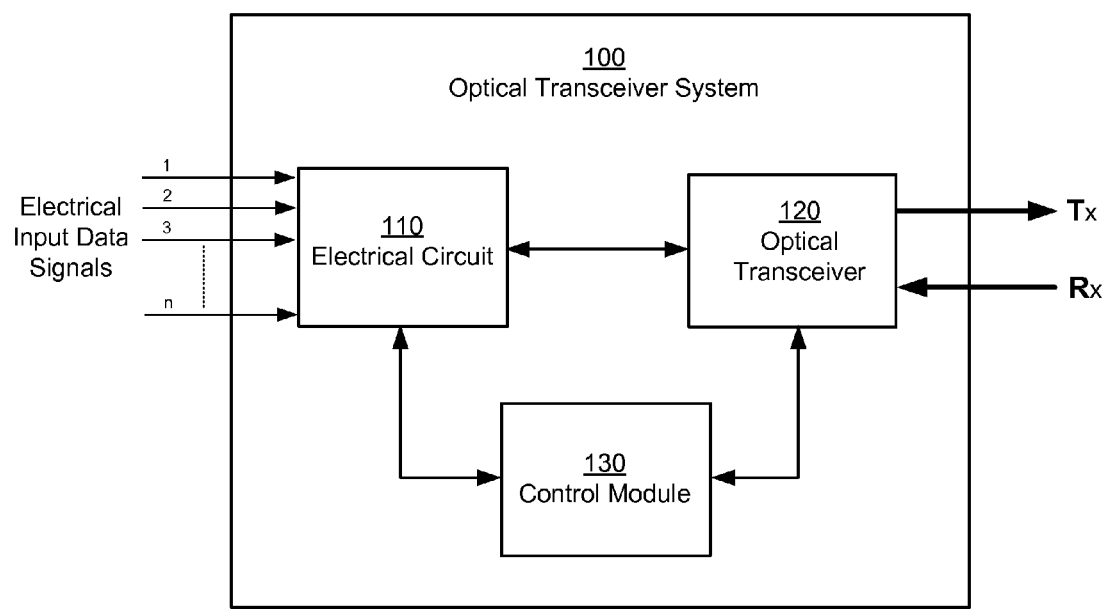
FIG. 1 is a system block diagram of an optical transceiver system, according to an embodiment.

In some embodiments, an apparatus includes an optical transceiver system. The optical transceiver system can be located within a switch or router located, for example, within a network or data center. Thus, the optical transceiver system can receive signals or data from other parts of the switch or router and then send the signals or data out to some other part of the network or data center. The optical transceiver system can also receive signals or data from other optical transceiver systems and/or switches and/or routers. The optical transceiver system includes a group of optical transmitters, a backup optical transmitter, a group of optical receivers, and a backup optical receiver. Each optical transmitter from the group of optical transmitters can transmit at a unique wavelength from a group of wavelengths and the backup optical transmitter can transmit at any wavelength from the group of wavelengths. Similarly, each optical receiver from the group of optical receivers can receive at a unique wavelength from a group of wavelengths and the backup optical receiver can receive at any wavelength from the group of wavelengths. When an optical transmitter from the group of optical transmitters fails, the backup optical transmitter can transmit at the wavelength associated with the failed optical transmitter. Likewise, when an optical receiver from the group of optical receivers fails, the backup optical receiver can receive at the wavelength associated with the failed optical receiver.

In some embodiments described herein, a backup optical transmitter is provided that need not produce light signals at a predetermined backup wavelength. For example, in an optical transceiver system that includes a group of optical transmitters where each optical transmitter transmits at a unique wavelength, a backup optical transmitter is provided that is capable of transmitting at any wavelength associated with the group of optical transmitters. In instances when an optical transmitter from the group fails, the backup optical transmitter can then transmit at the wavelength associated with the failed optical transmitter.

In addition to a backup optical transmitter, an optical coupler can combine the output from the backup optical transmitter with the output from the group of optical transmitters. In instances when an optical transmitter from the group fails, the light signals produced by the optical coupler contains light signals with the same group of wavelengths as the light signal produced prior to failure because the backup optical transmitter, upon activation, produces light signals at the wavelength associated with the failed optical transmitter. Accordingly, the light signals received by the far-side transceiver remains unaffected and the far-side transceiver need not be notified of the failure of an optical transmitter from the group of optical transmitters.

Similarly, optical transceiver systems used in WDM systems today generally also include a group of optical receivers. Typically, the group of optical receivers receives data by receiving light signals at multiple wavelengths. The light signals are first received as a multiplexed light beam containing multiple wavelengths. The light signals are then demultiplexed into its component wavelengths by an optical demultiplexer before being received by the group of optical receivers. In some optical transceiver systems, each optical receiver from the group receives light signals at a unique wavelength.

A backup optical receiver is provided that need not receive light signals at a predetermined backup wavelength. For example, in an optical transceiver system that includes a group of optical receivers where each optical receiver receives at a unique wavelength, the backup optical receiver can receive at any wavelength associated with the group of optical receivers. In instances when an optical receiver from the group fails, the backup optical receiver can then receive at the wavelength associated with the failed optical receiver.

In addition to a backup optical receiver, an optical coupler (distinct from the optical coupler discussed above) may be provided that can be coupled to a tunable optical filter. The optical coupler can send the received light signals to both the optical demultiplexer and the tunable optical filter. In instances when an optical receiver from the group of optical receivers fails, the tunable optical filter tunes to the wavelength associated with the failed optical receiver, so that the backup optical receiver can receive light signals at the tuned wavelength. As a result, the light signals transmitted by the far-side transceiver can remain unaffected and the far-side transceiver need not be notified of the failure of an optical receiver from the group of optical receivers.

As used herein, a module can be, for example, any assembly and/or set of operatively-coupled electrical components associated with performing a specific function, and can include, for example, a memory, a processor, electrical traces, optical connectors, software (stored in memory and/or executing in hardware) and/or the like.

As used in this specification, the singular forms "a," "an" and "the" include plural referents unless the context clearly dictates otherwise. Thus, for example, the term "an optical transceiver system" is intended to mean a single optical transceiver system or multiple optical transceiver systems.

FIG. 1 is a system block diagram of an optical transceiver system, according to an embodiment. The optical transceiver system 100 can be any high data rate optical transceiver system such as, for example, an on-off-keyed (OOK) transmitter, an optical M-ary quadrature amplitude modulation (M-QAM) transmitter, an optical M-ary pulse amplitude modulation (mPAM) transmitter, a polarization multiplexed (PM) M-QAM transmitter, and/or the like. The optical transceiver system 100 includes an electrical circuit 110, an optical transceiver 120, and/or a control module 130. The electrical circuit 110 is operatively coupled to the optical transceiver 120 and the electrical circuit 110 and the optical transceiver 120 are operatively coupled to the control module 130. Each of the electrical circuit 110, the optical transceiver 120, and the control module 130 can send signals to and/or receive signals from each other. Although the electrical circuit 110, the optical transceiver 120, and the control module 130 are shown separately in FIG. 1, each need not be physically separate from the other two. Stated differently, the electrical circuit 110 and/or the optical transceiver 120 and/or the control module 130 may be co-located and/or integrated together within a single module, subsystem or component.

The optical transceiver 120 includes the photonic components of the optical transceiver system 100. For example, the optical transceiver 120 may include a set of optical transmitters, a backup optical transmitter, a set of optical receivers, and a backup receiver (not shown in FIG. 1, but described in greater detail in FIG. 2). As discussed in detail herein, the optical transceiver 120 can send optical signals to and/or receive electric signals from the electrical circuit 110. Additionally, the optical transceiver 120 can also send signals to and/or receive signals from the control module 130, and can send optical signals a far-side optical transceiver (not shown in FIG. 1) and/or receive optical signals from a far-side optical transceiver (e.g., optical signals labeled $T_x$ and $R_x$ in FIG. 1). The transmitted optical signals $T_x$ includes n optical channels multiplexed onto a single optical fiber (or multiple optical fibers).

Each optical transmitter from the set of optical transmitters in the optical transceiver 120 can transmit at a unique wavelength from a set of wavelengths. Additionally, the backup optical transmitter in the optical transceiver 120 can transmit at any wavelength from the set of wavelengths. When an optical transmitter from the set of optical transmitters fails, the backup optical transmitter can transmit at the wavelength associated with the failed optical transmitter. Similarly, each optical receiver from the set of optical receivers in the optical transceiver 120 can receive at a unique wavelength from a set of wavelengths. Additionally, the backup optical receiver in the optical transceiver 120 can receive at any wavelength from the set of wavelengths. When an optical receiver from the set of optical receivers fails, the backup optical receiver can receive at the wavelength associated with the failed optical receiver. Hence, the optical transceiver system 100 can continue transmitting and/or receiving optical signals upon failure of an individual optical transmitter from the set of optical transmitters and/or an individual optical receiver from the set of optical receivers.

The electrical circuit 110 generates and/or processes electrical signals sent to and/or received from the optical transceiver 120. The electrical circuit 110 can also send to and/or receive electric signals from the control module 130. The electrical circuit 110 can be circuitry such as hardware (e.g., analog components) or firmware (e.g., Application-Specific Integrated Circuit). The electrical circuit 110 can include, for example, a multiplexer (not shown in FIG. 1) that sends channel signals to the optical transceiver 120 to be transmitted optically. The multiplexer in the electrical circuit 110 can receive a set of input transmitter channel signals and a backup transmitter channel signal to produce a set of channel signals or electrical input data signals (marked in FIG. 1 as 1, 2, 3, . . . n). In some instances, when an optical transmitter from the set of optical transmitters in the optical transceiver 120 fails, the multiplexer can send the set of input channel signals to a set of optical transmitters (not including the failed optical transmitter) and a backup optical transmitter, so that the optical transceiver system can continue to transmit at the wavelength associated with the failed optical transmitter.

The electrical circuit 110 can also include, for example, a demultiplexer (not shown in FIG. 1) that receives channel signals from the optical transceiver 120 that were received optically. For example, in some instances, when an optical receiver from the set of optical receivers in the optical transceiver 120 fails, the demultiplexer can receive a set of receiver channel signals and a backup receiver channel signal, so that the optical transceiver system 100 can continue to receive at the wavelength associated with the failed optical receiver.

Referring to the embodiment of the optical transceiver system 100 shown in FIG. 1, the control module 130 controls the detection and correction of channel failure in the optical transceiver system 100. Although FIG. 1 shows the control module 130 to be separate from the electrical circuit 110 and the optical transceiver 120, the control module 130 may be physically co-located with the electrical circuit 110 and/or the optical transceiver 120. For example, in some configurations, the control module 130 may be physically disposed within an integrated circuit package co-packaged with the set of optical transmitters, the backup optical transmitter, the plurality of optical receivers, and the backup optical receiver. In some instances, when an optical transmitter from the set of optical transmitters in the optical transceiver 120 fails, the control module 130 can activate the backup optical transmitter at the wavelength associated with the failed optical transmitter, so that the optical transceiver system 100 can continue to transmit at the wavelength associated with the failed optical transmitter. Similarly, in other instances, when an optical receiver from the set of optical receivers in the optical transceiver 120 fails, the control module 130 can activate the backup optical receiver at the wavelength associated with the failed optical receiver, so that the optical transceiver system can continue to receive at the wavelength associated with the failed optical receiver.

Figure 2:
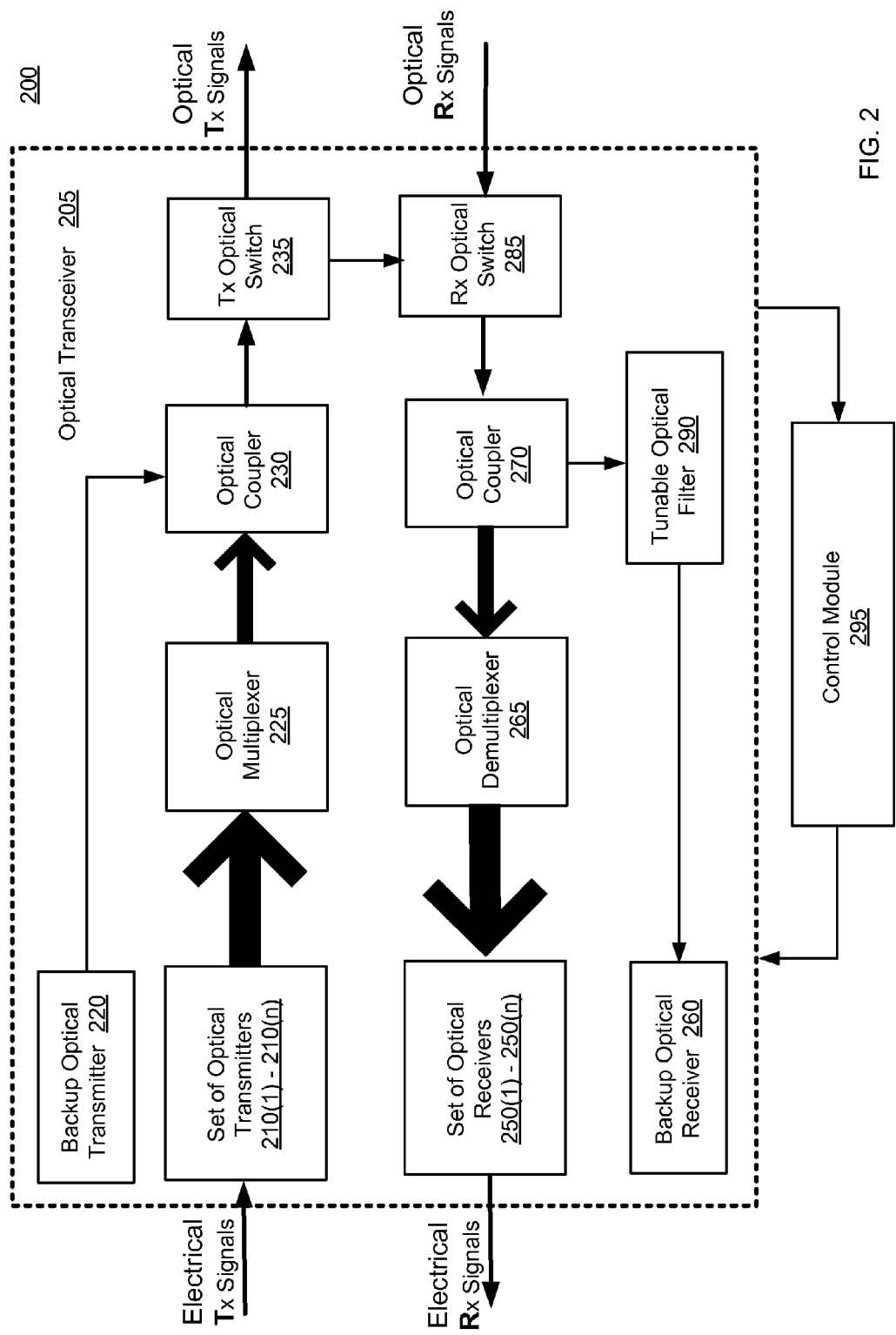
FIG. 2 is a system block diagram of an optical transceiver of an optical transceiver system, according to an embodiment.

FIG. 2 is a system block diagram of an optical transceiver of the optical transceiver system, according to an embodiment. The optical transceiver system 200 shown in FIG. 2 is an example of a portion of the optical transceiver system 100 shown in FIG. 1. Optical transceiver system 200 includes an optical transceiver 205 and a control module 295. The optical transceiver 205 is similar to the optical transceiver 120 described in FIG. 1. Similarly, the control module 295 is also similar to the control module 130 described in FIG. 1.

The optical transceiver 205 includes a set of optical transmitters 210(1)-210(n), a backup optical transmitter 220, an optical multiplexer 225, an optical coupler 230, a transmission (Tx) optical switch 235, a set of optical receivers 250(1)-250(n), a backup optical receiver 260, an optical demultiplexer 265, an optical coupler 270, a receive (Rx) optical switch 285, and a tunable filter 290. The set of optical transmitters 210(1)-210(n) contains n number of individual optical transmitters. The set of optical transmitters 210(1)-210(n) can receive electrical transmission (Tx) signals from, for example, the electrical circuit 110 shown in FIG. 1. The set of optical transmitters 210(1)-210(n) outputs optical signals at multiple (or a set of) optical wavelengths. In some instances, each optical transmitter from the set of optical transmitters 210(1)-210(n) transmits at a specific wavelength from a set of wavelengths, and/or the backup optical transmitter can transmit at any wavelength from the set of wavelengths. The optical signals transmitted by the set of optical transmitters 210(1)-210(n) are received at the optical multiplexer 225, where the optical multiplexer 225 is coupled to the set of optical transmitters 210(1)-210(n) and not coupled to the backup optical transmitter 220. In the event that an optical transmitter from the set of optical transmitters 210(1)-210(n) fails, the optical multiplexer 225 remains operatively coupled to that optical transmitter but the output/signals for the channel corresponding to the failed optical transmitter is switched out and replaced by the output/signals from the backup optical transmitter 220.

The optical multiplexer 225 is a hardware device that can, for example, multiplex and route different channels of light or optical signals into or out of a single mode fiber (SMF). The optical multiplexer 225 can multiplex the optical signals generated and/or transmitted by the different optical transmitters from the set of optical transmitters 210(1)-210(n) (n channels of optical signal) and send the different channels of optical signals to the optical coupler 230 and the transmit (Tx) optical switch 235. In some configurations, a power monitor included in the control module 295 (not shown in FIG. 2) can monitor the power in the optical signals in the different channels. In such configurations, the power monitor can monitor the power of the optical signals at each unique wavelength from the set of wavelengths associated with the different channels. In such instances, the power monitor can detect a failure of an individual optical transmitter from the set of optical transmitters 210(1)-210(n) if, for example, the power in optical signals transmitted by the individual optical transmitter at a unique wavelength is below a pre-determined level.

In instances when an optical transmitter from the set of optical transmitters 210(1)-210(n) fails, the backup optical transmitter 220 can transmit at the wavelength associated with the failed optical transmitter. The optical coupler 230 connected to the optical multiplexer 225 and the backup optical transmitter 220 can combine the optical signals from the backup optical transmitter 220 and the optical signals from each optical transmitter from the set of optical transmitters 210(1)-210(n) (excluding the failed optical transmitter). In some instances, the backup optical transmitter 220 and/or the optical coupler 230 is activated by the control module 295.

The optical signals combined at the optical coupler 230 are transmitted, through the transmission (Tx) optical switch 235, as optical transmission (Tx) signals to, for example, a far-side transceiver. Note the optical transmission (Tx) signals include n optical channels multiplexed onto a single optical fiber (or multiple optical fibers). Because these optical transmission (Tx) signals are not affected by the failure of an optical transmitter from the set of optical transmitters 210(1)-210(n), a far-side transceiver and any components within a link between the optical transceiver system 200 and the far-side transceiver is not notified of a failure of an optical transmitter from the set of optical transmitters 210(1)-210(n) and the activation/use of the backup optical transmitter 220.

The optical transceiver 205 can also receive optical signals from, for example, a far-side receiver (not shown in FIG. 2). The optical receive (Rx) signals are received, as, for example, a multiplexed optical beam containing multiple (n) channels of received optical signals at a set of wavelengths, by the receive (Rx) optical switch 285. In some configurations, a power monitor included in the control module 295 (not shown in FIG. 2) can monitor the power of the different channels of the received optical signal. In some instances, the power monitor can measure the power in the different channels of the received optical signal at each unique wavelength from the set of wavelengths. In such instances, the power monitor can detect a failure of a received optical signal channel if, for example, the detected power in an optical channel at a specific wavelength is below a pre-determined level.

The receive (Rx) optical switch 285 can send the received optical signals to the optical coupler 270. The optical coupler 270 can send the optical signals to the optical demultiplexer 265 and/or the tunable optical filter 290. The optical demultiplexer 265 can demultiplex the different channels of the received optical signals and send the optical signal to the set of optical receivers 250(1)-250(n). The optical demultiplexer 265 is coupled to the optical coupler 270 and the set of optical receivers 250(1)-250(n) but not to the backup optical receiver 260. Each optical receiver from the set of optical receivers 250(1)-250(n) can receive optical signals at a specific wavelength from a set of wavelengths, and/or the backup optical receiver 260 can receive at any wavelength from the set of wavelengths. In the event that an optical receiver from the set of optical receivers 250(1)-250(n) fails, the optical demultiplexer 265 remains operatively coupled to that failed optical receiver but the output/signals for the channel corresponding to the failed optical receiver is switched out, having been redirected to the tunable optical filter 290 and the backup optical receiver 260.

In some instances, when an optical receiver from the set of optical receivers 250(1)-250(n) fails, the optical coupler 270 can send the received optical signals to both the optical demultiplexer 265 and the tunable optical filter 290. In such instances, the tunable optical filter 290 can tune to the wavelength associated with the failed optical receiver and send the tuned optical signals (at the wavelength associated with the failed optical receiver) to the backup optical receiver 260. The backup optical receiver 260 can receive the optical signals at the wavelength associated with the failed optical receiver. In some instances, the backup optical receiver 260 and/or the optical coupler 270 can activated by the control module 295. Because optical signals at all wavelengths from the set of wavelengths continue to be received after the failure of an optical receiver from the set of optical receivers 250, a far-side transceiver and any components within a link between the optical transceiver system 200 and the far-side transceiver is not notified of a failure of an optical receiver from the set of optical receivers 250 and the activation/use of the backup optical receiver 260.

The transmission (Tx) optical switch 235 and the receive (Rx) optical switch 285 collectively can define a loopback path when both are activated. The loopback path runs from the optical coupler 230 to the transmit (Tx) optical switch 235, to the receive (Rx) optical switch 285, and to the optical coupler 270. The loopback path directs the optical signals transmitted by the set of optical transmitters 210(1)-210(n) and/or the backup optical transmitter 220 to the set of optical receivers 250(1)-250(n) and/or the backup optical receiver 260. Thus, optical signals transmitted through the loopback path do not leave the optical transmitter system 200. The loopback path, for example, can allow optical signals transmitted by the set of optical transmitters 210(1)-210(n) and/or the backup optical transmitter 220, and/or optical signals received by the set of optical receivers 250(1)-250(n) and/or the backup optical receiver 260 to be analyzed for signal quality by an electrical circuit (e.g., electrical circuit 110 of FIG. 1) as discussed below. The transmission (Tx) optical switch 235 and the receive (Rx) optical switch 285 can be activated, for example, by the control module 295 to collectively define the loopback path.

Figure 3:
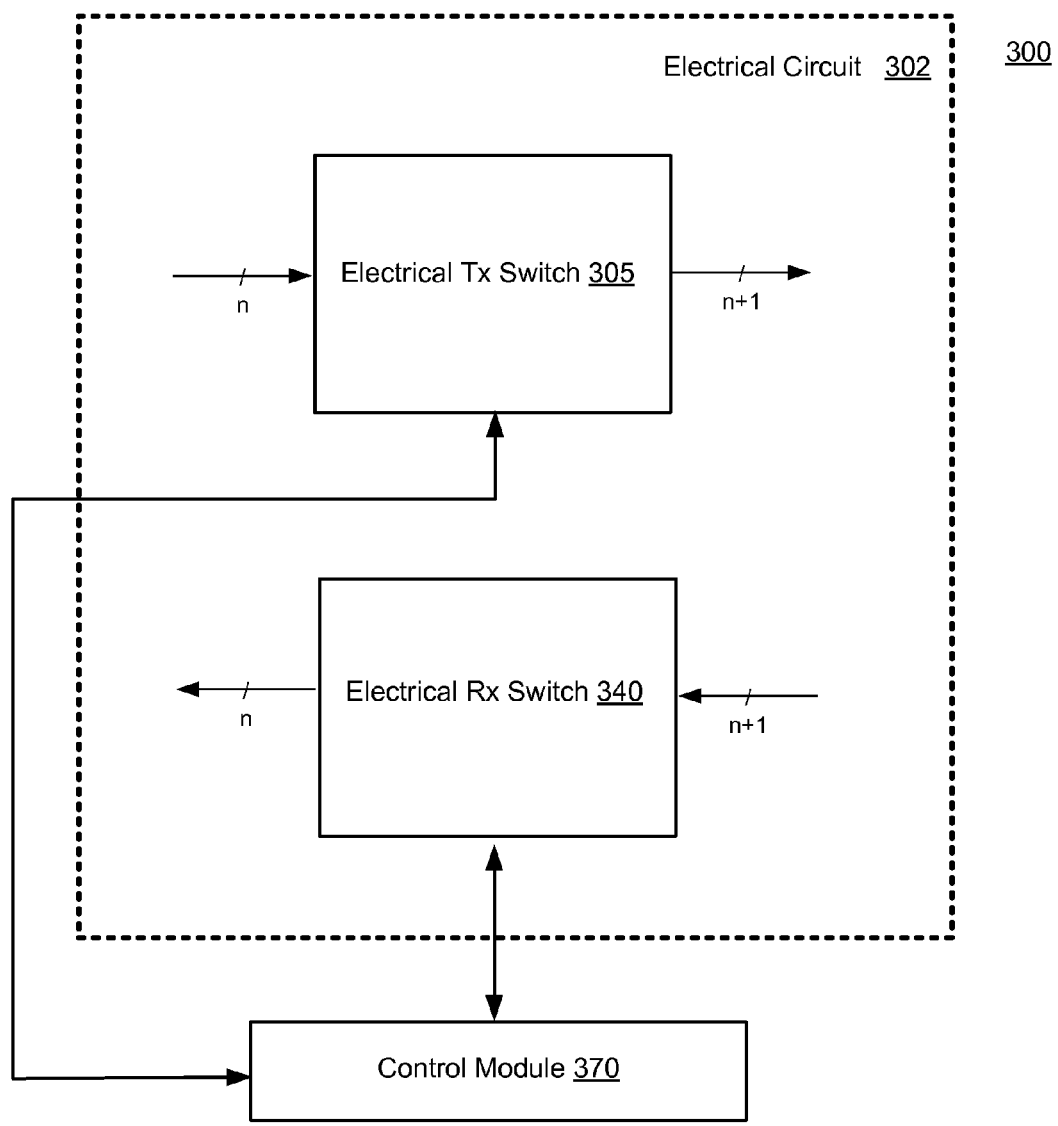
FIG. 3 is a system block diagram of an electrical circuit an optical transceiver system, according to an embodiment.

FIG. 3 is a system block diagram of an electrical circuit of the optical transceiver system, according to an embodiment. The optical transceiver system 300 shown in FIG. 3 is an example of a portion of the optical transceiver system 100 shown in FIG. 1. The optical transceiver system 300 can be located within a switch or router located for example, within a network or data center. Thus, the optical transceiver system 300 can receive signals or data from a first portion of the switch or router and then send the signals or data out to a second portion of the network. Optical transceiver system 300 includes an electrical circuit 302 and a control module 370. The electrical circuit 302 is an example of the electrical circuit 110 described in FIG. 1. Similarly, the control module 370 is an example of the control module 130 described in FIG. 1.

The electrical circuit 302 includes an electrical transmission (Tx) switch 305 and an electrical receive (Rx) switch 340. The electrical transmit (Tx) switch 305 can include, for example, a clock and data recovery (CDR) array, a set of demultiplexers, a pseudorandom binary sequence (PRBS) generator, a multiplexer, a modulator driver array and a laser driver array (not shown in FIG. 3). The electrical receive (Rx) switch 340 can include, for example, a transimpedance amplifier/limiting amplifier (TIA/LA) array, a demultiplexer, a pseudorandom binary sequence (PRBS) analyzer, a set of multiplexers and a serializer array (not shown in FIG. 3).

The CDR array in the electrical transmit (Tx) switch 305 can receive transmitter channel signals and/or data from, for example, other portions of a switch or router (not shown in FIG. 3) within which the optical transceiver system 300 is located. In some instances, the CDR array can include an eye pattern analyzer (EPA). The EPA can repetitively sample the received transmitter channel signals and/or data to increase the likelihood that the received transmitter channel signals and/or data is of adequate power and/or quality. The CDR array can send a set of transmitter channel signals to a first demultiplexer, where the first demultiplexer can demultiplex the set of transmitter channel signals into two new sets of transmitter channel signals. For example, in some instances, the CDR array can send a set of 48 transmitter channel signals to the first demultiplexer that can demultiplex the set of 48 transmitter channel signals into two sets of 24 transmitter channel signals. In such instances, the first demultiplexer can send a first set of 24 transmitter channel signals to a second demultiplexer and the second set of 24 transmitter channel signals to a third demultiplexer. The second demultiplexer can demultiplex the first set of 24 transmitter channel signals into a first group of a 24 transmitter channel signals and a first backup transmitter channel signal, and can send the signals to a multiplexer. In such instances, the third demultiplexer can demultiplex the second set of 24 transmitter channel signals into a second group of a 24 transmitter channel signals and a second backup transmitter channel signal, and can send the signals to the multiplexer. In such instances, the multiplexer can receive the first backup transmitter channel signal, the first group of 24 transmitter channel signals, the second backup transmitter channel signal, and the second group of 24 transmitter channel signals to produce a set of 50 channel signals. The multiplexer can send the set of 50 channel signals through the modulator driver array and the laser driver array, to an optical transceiver such as, for example, the optical transceiver 120 shown in FIG. 1, or the optical transceiver 205 shown in FIG. 2.

Referring to FIGS. 2 and 3, in some instances, when an optical transmitter from the set of optical transmitters (shown as 210(1)-210(n) in FIG. 2) fails, the multiplexer can send the set of up to 50 channel signals to the set of optical transmitters 210(1)-210(n) and the backup optical transmitter 220 (shown in FIG. 2). The set of optical transmitters 210(1)-210(n) and the backup optical transmitter 220 can then transmit the set of up to 50 channel signals as optical signals. The multiplexer in the electrical Tx switch 305 can be activated by the control module 370. In other words, with such an embodiment having 48 input channels and 50 output channels, two of the output channels are spare channels. The multiplexer can switch any two of the 48 input channels to either of the two output channels. In fact, both spare channels need not be used simultaneously; one spare can be used after a first failure and the other spare can be used after a second failure. In other embodiments, fewer or more spare channels can be implemented.

Referring to FIG. 3, the demultiplexer included within the electrical Rx switch 340 can receive in some instances, for example, a set of 50 channel signals through the TIA/LA array from an optical transceiver such as, for example, the optical transceiver 120 shown in FIG. 1, or the optical transceiver 205 shown in FIG. 2. The TIA/LA array can include an EPA, where the EPA can repetitively sample the received channel signals to increase the likelihood that the channel signals are of adequate power and/or quality. In such instances, the demultiplexer can demultiplex the set of 50 channel signals into a first backup receiver channel signal, a first group of 24 receiver channel signals, a second backup receiver channel signal, and a second group of 24 receiver channel signals. In such instances, the demultiplexer can send the first backup receiver channel signal and the first group of 24 receiver channel signals to a first multiplexer. In such instances, the demultiplexer can send the second backup receiver channel signal and the second group of 24 receiver channel signals to a second multiplexer. The first multiplexer can multiplex the first backup receiver channel signal and the first group of 24 receiver channel signals into a first set of 24 receiver channel signals and can send the signals to a third multiplexer. Similarly, in such instances, the second multiplexer can multiplex the second backup receiver channel signal and the second group of 24 receiver channel signals into a second set of 24 receiver channel signals and also can send it to the third multiplexer. In such instances, the third multiplexer can multiplex the first set of 24 receiver channel signals and the second set of 24 receiver channel signals into a set of 48 receiver channel signals, and can send the signals to, for example, a serializer array. The serializer array can send receiver channel signals to, for example, other portions of a switch or router (not shown in FIG. 3) within which the optical transceiver system 300 is located.

Referring to FIGS. 2 and 3, in some instances, when an optical receiver from the set of optical receivers marked as 250(1)-250(n) in FIG. 2 fails, the demultiplexer included in the electrical Rx switch 340 can receive a set of receiver channel signals from, for example, the set of optical receivers 250(1)-250(n) and a backup receiver channel signal (e.g., the backup optical receiver 260 shown in FIG. 2). Accordingly, in such instances, the set of optical receivers 250(1)-250(n) and the backup optical receiver 260 can receive the channel signals as optical signals and the demultiplexer in the electrical Rx switch 340 can be activated by the control module 370.

Control module 370 can be a compute device having a processor and a memory (not shown). The processor can be any suitable processor configured to run and/or execute the control functionality of control module 370 as described herein. The functionality of control module 370 can comprise sub-modules each of which is associated with a particular function or set of functions of the control module 370. In other words, the control module 370 can be any combination of hardware-based module(s) (e.g., a processor, a field-programmable gate array (FPGA), an application specific integrated circuit (ASIC), a digital signal processor (DSP), etc.) and/or software-based module(s) (e.g., a module of computer code stored in the memory and/or executed at the processor) capable of performing one or more specific control functions associated with control module 370.

The control module 370 can send signals and/or receive signals through, for example, a general-purpose input/output (GPIO), the analog-to-digital converter (ADC) array, and the digital-to-analog converter (DAC) array. In some instances, the GPIO can include, for example, one or more generic pins that can be programmed by a user to either accept input from or provide output to devices external to the optical transceiver system 300. The ADC array can include, for example, one or more devices that can convert a continuous signal (e.g., voltage) to a set of digitized values that can represent the signal amplitude. The DAC array can include, for example, one or more devices that convert a digital signal (e.g., binary) to an analog signal (e.g., current, voltage, or electric charge). The ADC array and DAC array can allow the control module 370 to send and/or receive signals in digital and/or analog format.

Referring to FIGS. 2 and 3, the electrical circuit 302 can be coupled to an optical transceiver such as the optical transceiver 205 (shown in FIG. 2) that includes the transmission (Tx) optical switch 235 and the receive (Rx) optical switch 285. In such instances, the PRBS generator included in the electrical Tx switch 305 is coupled to the set of optical transmitters 210(1)-210(n) (shown in FIG. 2) through the multiplexer, the modulator driver array and the laser driver array contained within the electrical Tx switch 305. In such instances, the PRBS analyzer included in the electrical Rx switch 340 is coupled to the set of optical receivers 250(1)-250(n) (shown in FIG. 2) through the demultiplexer and the TIA/LA array included in the electrical Rx switch 340. As discussed above, the transmission (Tx) optical switch 235 and the receive (Rx) optical switch 285 collectively can define a loopback path when both are activated. As further discussed above, the loopback path runs from the optical coupler 230 to the transmit (Tx) optical switch 235, to the receive (Rx) optical switch 285 and the optical coupler 270. In instances when a loopback path is defined, the PRBS generator in the electrical Tx switch 305 can generate a pattern and send a signal having the pattern to the PRBS analyzer included in the electrical Rx switch 340 via the loopback path. In some instances, the control module 370 can send a first signal to the electric circuit 302 to activate the transmission (Tx) optical switch 235 and the receive (Rx) optical switch 285 such that the loopback path is defined. The control module can send a second signal to the electric circuit 302 to activate the PRBS generator and the PRBS analyzer, such that the PRBS generator generates a pattern and sends a signal having that pattern to the PRBS analyzer via the loopback path, and such that the PRBS analyzer receives the signal.

Note that the embodiment of the electrical circuit 302 shown in FIG. 3 (that includes both an electrical Tx switch 305 and an electrical Rx switch 340) is presented as an example only, and not a limitation. In other embodiments, the electrical circuit 302 can include only electrical Tx switch 305 and not the electrical Rx switch 340. In yet other embodiments, the electrical circuit 302 can include only electrical Rx switch 340 and not the electrical Tx switch 305.

Figure 4:
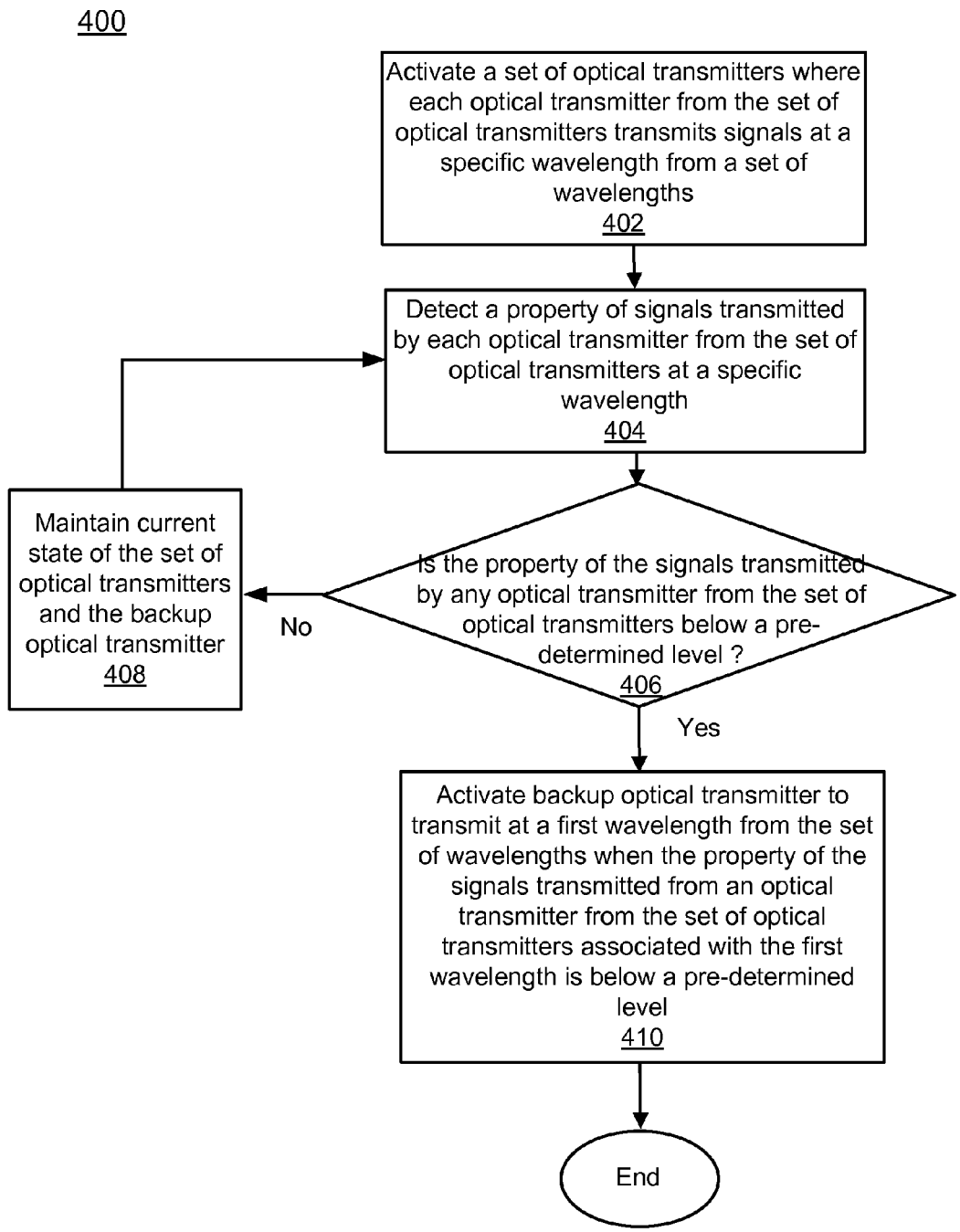
FIG. 4 is a flowchart illustrating a method for activating a backup optical transmitter to operationally replace a failed optical transmitter from a set of optical transmitters, according to an embodiment.

FIG. 4 is a flow chart illustrating a method for activating a backup optical transmitter to replace a failed optical transmitter from a set of optical transmitters, according to an embodiment. The method includes activating a set of optical transmitters by, for example, a control module, at 402. As described above, in some instances, each optical transmitter from the set of optical transmitters transmits optical signals at a unique wavelength from a set of wavelengths. Additionally, a backup optical transmitter, not from the set of optical transmitters, can transmit at any wavelength from the set of wavelengths. As described above, in some instances, the set of optical transmitters and/or the backup optical transmitter is included in an optical transceiver of the optical transceiver system.

The power of optical signals transmitted by each optical transmitter from the set of optical transmitters at a unique wavelength is detected by, for example, a power monitor (e.g., included in the control module), at 404. The detected power of optical signals transmitted by each optical transmitter from the set of optical transmitters is processed at, for example, the control module to determine if the power of optical signals transmitted by any optical transmitter from the set of optical transmitters is below an acceptable (pre-determined) level, at 406. A signal representing the detected power of optical signals transmitted by each optical transmitter can be received by the control module via the optical transceiver and/or the electrical circuit. In some instances, the detected power of the optical signals transmitted by each optical transmitter can be greater than or equal to the pre-determined level. In such instances, the detected power can indicate that a channel failure has not occurred (i.e., each optical transmitter from the set of optical transmitters is transmitting properly). In this situation, the current state of the set of optical transmitters and the backup optical transmitter is maintained by, for example, the control module, at 408. Stated differently, the backup optical transmitter is not activated.

In other instances, the detected power of the optical signals transmitted by a particular optical transmitter can be less than the pre-determined level. In such instances, the level of detected power can indicate that a channel failure has occurred (i.e., a particular optical transmitter from the set of optical transmitters is not transmitting properly). In such instances, a backup optical transmitter is activated by, for example, the control module to transmit optical signals at the wavelength (from the set of wavelengths) associated with the failed optical transmitter (from the set of optical transmitters), at 410. Note that activating the backup optical transmitter includes activating the relevant optical components and (electrically) switching the relevant data from the failed optical transmitter to the backup optical transmitter. As described above, in some instances, a multiplexer can send a set of channel signals to both the set of optical transmitters and the backup optical transmitter. The set of optical transmitters and the backup optical transmitter can then transmit the set of channel signals as optical signals. As described above, in some instances, an optical coupler can combine the output of the backup optical transmitter and the output of each optical transmitter from the set of optical transmitters (excluding the failed optical transmitter). The combined output is transmitted as optical transmit (Tx) signals to, for example, a far-side transceiver. Because these optical transmit (Tx) signals are not affected by the failure of an optical transmitter from the set of optical transmitters, the far-side transceiver and any components within a link between the optical transceiver system and the far-side transceiver is not notified of a failure of an optical transmitter from the set of optical transmitters and the activation/use of the backup optical transmitter.

As described above, in some instances, a loopback path can be defined, upon activation of both a transmission (Tx) optical switch and a receive (Rx) optical switch, that allows optical signals transmitted by the set of optical transmitters to be analyzed for signal quality by, for example, a pseudorandom binary sequence (PRBS) analyzer and/or the control module. In such instances, the signal quality of the transmitted optical signals is processed to determine if the signal quality is below an acceptable (pre-determined) level. In some instances, the signal quality of the optical signals transmitted by an optical transmitter from the set of optical transmitters can be below the pre-determined level of signal quality. In such instances, the poor signal quality can indicate that a channel failure has occurred (e.g., a particular optical transmitter from the set of optical transmitters is transmitting optical signals of below acceptable quality). In this situation, a backup optical transmitter is activated by, for example, the control module to transmit optical signals at the wavelength (from the set of wavelengths) associated with the failed optical transmitter (from the set of optical transmitters).

Figure 5:
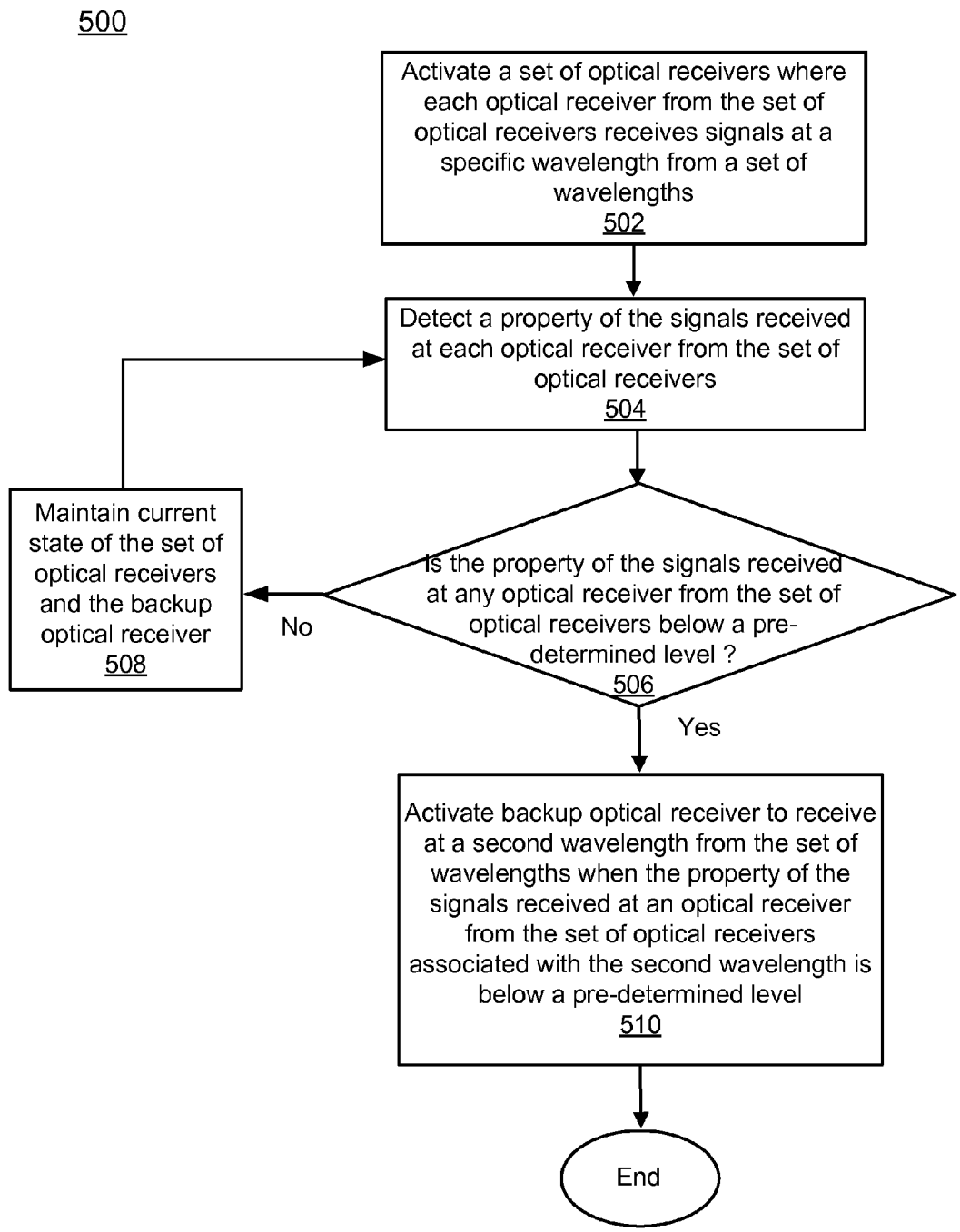
FIG. 5 is a flowchart illustrating a method for activating a backup optical receiver to operationally replace a failed optical receiver from a set of optical receivers, according to an embodiment.

FIG. 5 is a flow chart illustrating a method for activating a backup optical receiver to replace a failed optical receiver from a set of optical receivers, according to an embodiment. The method includes activating a set of optical receivers by, for example, a control module, at 502. As described above, in some instances, each optical receiver from the set of optical receivers receives optical signals at a unique wavelength from a set of wavelengths. Additionally, a backup optical receiver, not from the set of optical receivers, can receive optical signals at any wavelength from the set of wavelengths. As described above, in some instances, the set of optical receivers and/or the backup optical receiver is included in an optical transceiver of the optical transceiver system.

The power of optical signals received by each optical receiver from the set of optical receivers at a unique wavelength is detected by, for example, an eye-scan analyzer or a power monitor, at 504. The detected power of the optical signals received by each optical receiver from the set of optical receivers is processed at, for example, the control module to determine if the power of the optical signals received by any optical receiver from the set of optical receivers is below an acceptable (pre-determined) level, at 506. A signal representing the detected power of the optical signals received by each optical receiver can be received by the control module via the optical transceiver and/or the electrical circuit. In some instances, the detected power of optical signals received by each optical receiver can be greater than or equal to the pre-determined level. In such instances, the level of detected power can indicate that a channel failure has not occurred (i.e., each optical receiver from the set of optical receivers is receiving optical signals adequately). In such instances, the current state of the set of optical receivers and the backup optical receiver is maintained by, for example, the control module, at 508. Stated differently, the backup optical receiver is not activated.

In other instances, the detected power of the optical signals received by a particular optical receiver can be less than the pre-determined level. In such instances, the level of detected power can indicate that a channel failure has occurred (i.e., a particular optical receiver from the set of optical receivers is not receiving optical signals adequately). In such instances, a backup optical receiver is activated by, for example, the control module to receive optical signals at the wavelength (from the set of wavelengths) associated with the failed optical receiver (from the set of optical receivers), at 510. Note that activating the backup optical receiver includes activating the relevant optical components and (electrically) switching the relevant data from the failed optical receiver to the backup optical receiver. As described above, in some instances, an optical coupler can receive multiplexed optical signals and send them to both the set of optical receivers (through an optical demultiplexer) and the backup optical receiver (through a tunable optical filter). In such instances, the tunable optical filter can tune to the wavelength associated with the failed optical receiver and send the tuned optical signals (at the wavelength associated with the failed optical receiver) to the backup optical receiver, and the backup optical receiver can then receive the optical signal at the wavelength associated with the failed optical receiver. As described above, in some instances, a demultiplexer (distinct from the optical demultiplexer) can receive a set of receiver channel signals from the set of optical receivers and a backup receiver channel signal from the backup optical receiver. Accordingly, the optical signals received by the set of optical receivers and the backup optical receiver can be processed by, for example, the electrical circuit.

Because optical signals at all wavelengths from the set of wavelengths continue to be received after the failure of an optical receiver from the set of optical receivers, the far-side transceiver and any components within a link between the optical transceiver system and the far-side transceiver is not notified of a failure of an optical receiver from the set of optical receivers and the activation/use of the backup optical receiver.

As described above, in some instances, a loopback path can be defined, upon activation of both a transmit (Tx) optical switch and a receive (Rx) optical switch, that allows optical signals received by the set of optical receivers to be analyzed for signal quality by, for example, a pseudorandom binary sequence (PRBS) analyzer and/or the control module. In such instances, the signal quality of the received optical signals is processed to determine if the signal quality is below an acceptable (pre-determined) level. In some instances, the signal quality of optical signals received by an optical receiver from the set of optical receivers can be below the acceptable level of signal quality. In such instances, the poor signal quality can indicate that a channel failure has occurred (e.g., a particular optical receiver from the set of optical receivers is receiving optical signals but not receiving properly). In this situation, a backup optical receiver is activated by, for example, the control module to receive optical signals at the wavelength (from the set of wavelengths) associated with the failed optical receiver (from the set of optical receivers).

In the methods and apparatus shown in FIGS. 1-5, at least one redundant (or backup) optical channel is included in the transmission and/or receive direction. Channel failure detection mechanisms in the transmission and/or receive directions are included in the photonic elements and/or electronic circuit that is controlled by the control module. When a channel failure is detected in the transmission and/or receive direction by the control module, the control module powers off the failed channel and configures the redundant (or backup) channel to replace the failed channel, switches data from the failed channel to the redundant channel and enables the redundant (or backup) optical channel. For optical transceivers using multiple channels (e.g., WDM channels), transmission side optical redundancy is provided through a backup optical channel (that is optically coupled into the transmission light path) using a tunable laser capable of tuning to any of the WDM channels used in the optical transceiver system. In the receive direction, when a receive channel failure is detected, the WDM channel associated with the failure is selected by a tunable optical filter that rejects the remaining WDM channels. The WDM channel that passes through the tunable filter is detected by the backup optical receiver. The methods and apparatus shown in FIGS. 1-5 can operationally replace a failed optical channel within an optical transceiver system, eliminating the necessity for transceiver replacement upon channel failure. This can be advantageous for board mounted transceivers, where factory replacements for failed channels can be avoided. The methods and apparatus shown in FIGS. 1-5 can also be applied in the manufacturing factory to improve factory yield and thereby reduce manufacturing costs.

The methods and apparatus shown in FIGS. 1-5 can be applied to or embodied in a variety of optical transceiver systems such as those including, for example, an optical on-off keyed (OOK) transmitter, an optical M-ary quadrature amplitude modulated (M-QAM) transmitter, a polarization multiplexed (PM) M-QAM transmitter where two or more M-QAM transmitters in substantially orthogonal polarization states are multiplexed in the polarization domain. Within the optical transceiver system, the M-QAM transmitter can be paired with, for example, a direct detection receiver or a coherent receiver. Specific examples include direct detection on-off keyed (OOK), direct detection m-ary pulse amplitude modulation (mPAM), direct detection differential QPSK (DOPSK), coherent PM-QPSK (i.e., coherent PM-4-QAM), coherent PM-16-QAM, and/or the like. Additionally, the methods and apparatus described herein can apply to both a single polarization transmitter and a polarization-multiplexed transmitter.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
    transmitting at a unique wavelength from a plurality of wavelengths from each optical transmitter from a plurality of optical transmitter;
    transmitting at a first wavelength from the plurality of wavelengths from a backup optical transmitter when an optical transmitter from the plurality of optical transmitters and associated with the first wavelength fails; and
    defining a loopback path when a first optical switch and a second optical switch are activated, the first optical switch associated with the plurality of optical transmitters and the backup optical transmitter, the second optical switch associated with a plurality of optical receivers.

2. The method of claim 1, further comprising:
controlling the backup optical transmitter so that the backup optical transmitter is activated at the first wavelength when the optical transmitter from the plurality of optical transmitters and associated with the first wavelength fails.

3. The method of claim 1, further comprising:
receiving an output from the backup optical transmitter and not output from the optical transmitter associated with the first wavelength when the optical transmitter associated with the first wavelength fails;
receiving an output of each optical transmitter from the plurality of optical transmitters except the optical transmitter associated with the first wavelength fails to produce a multiplexed output; and
combining the output of the backup optical transmitter and the multiplexed output.

4. The method of claim 1, further comprising:
receiving a plurality of transmitter channel signals; and
sending a transmitter channel signal from the plurality of transmitter channel signals and associated with the first wavelength to the backup optical transmitter and not the optical transmitter associated with the first wavelength when the optical transmitter associated with the first wavelength fails.

5. The method of claim 1, wherein:
transmitting at the first wavelength from the backup optical transmitter, when the optical transmitter associated with the first wavelength fails, includes transmitting without notifying a far-side transceiver system and any components within a link between the plurality of optical transmitters and the far-side transceiver.

6. A method, comprising:
operationally replacing an optical transmitter from a plurality of optical transmitters with a backup optical transmitter, when that optical transmitter fails, without notifying a far-side transceiver and any components within a link between the plurality of optical transmitters and the far-side transceiver;
defining a loopback path when a first optical switch and a second optical switch are activated, the first optical switch associated with the plurality of optical transmitters and the backup optical transmitter, the second optical switch associated with a plurality of optical receivers; and
receiving a signal (1) having a pattern generated by a pattern generator, and (2) sent from the pattern generator to a pattern analyzer via the loopback path.

7. The method of claim 6, wherein:
transmitting at a unique wavelength from a plurality of wavelengths from each optical transmitter from the plurality of optical transmitter; and
controlling the backup optical transmitter so that the backup optical transmitter is activated at a first wavelength when the optical transmitter from the plurality of optical transmitters and associated with the first wavelength fails.

8. The method of claim 6, further comprising:
receiving an output from the backup optical transmitter and not output from the optical transmitter associated with a first wavelength when the optical transmitter associated with the first wavelength fails;
receiving an output of each optical transmitter from the plurality of optical transmitters except the optical transmitter associated with the first wavelength to produce a multiplexed output; and
combining the output of the backup optical transmitter and the multiplexed output.

9. The method of claim 6, wherein:
receiving a plurality of transmitter channel signals; and
sending a transmitter channel signal from the plurality of transmitter channel signals and associated with a first wavelength to the backup optical transmitter and not the optical transmitter associated with the first wavelength when the optical transmitter associated with the first wavelength fails.

10. A method, comprising:
activating a backup optical transmitter at a first wavelength;
causing an output of an optical transmitter from a plurality of optical transmitters and associated with the first wavelength to be blocked, when the optical transmitter from the plurality of optical transmitters and associated with the first wavelength fails; and
activating (1) a first optical switch associated with the plurality of optical transmitters and the backup optical transmitter and (2) a second optical switch associated with a plurality of optical receivers, such that the first optical switch and the second optical switch are collectively configured to define a loopback path when the first optical switch and the second optical switch are activated.

11. The method of claim 10, further comprising:
sending a signal to a multiplexer that receives a plurality of transmitter channel signals and a backup transmitter channel signal to produce a plurality of channel signals such that the multiplexer sends the plurality of channel signals to a set of the plurality of optical transmitters and the backup optical transmitter when the optical transmitter associated with the first wavelength fails.

12. The method of claim 10, wherein:
the activating the backup optical transmitter includes activating the backup optical transmitter such that the backup optical transmitter transmits at the first wavelength, when the optical transmitter associated with the first wavelength fails, without notifying a far-side transceiver and any components within a link between the plurality of optical transmitters and the far-side transceiver.

13. A method, comprising:
receiving at a unique wavelength from a plurality of wavelengths from each optical receiver from a plurality of optical receivers;
receiving at a first wavelength from the plurality of wavelengths from a backup optical receiver when an optical receiver from the plurality of optical receivers and associated with the first wavelength fails; and
defining a loopback path when a first optical switch and a second optical switch are activated, the first optical switch associated with the plurality of optical receivers and the backup optical receiver, the second optical switch associated with a plurality of optical transmitters.

14. The method of claim 13, further comprising:
controlling the backup optical receiver so that the backup optical receiver is activated at the first wavelength when the optical receiver from the plurality of optical receivers and associated with the first wavelength fails.

15. The method of claim 13, further comprising:
demultiplexing a plurality of optical signals, each optical signal from a set of optical signals from the plurality of optical signals being associated with an optical receiver from the plurality of optical receivers and not to the backup optical receiver; and tuning an optical filter to the first wavelength when the optical receiver from the plurality of optical receivers and associated with the first wavelength fails such that an optical signal from the plurality of optical signals is sent to the backup optical receiver.

16. The method of claim 13, further comprising:

receiving a plurality of receiver channel signals; and sending a receiver channel signal from the plurality of receiver channel signals and associated with the first wavelength to the backup optical transmitter and not the optical receiver associated with the first wavelength when the optical receiver associated with the first wavelength fails.

17. The method of claim 13, wherein:

receiving at the first wavelength from the backup optical receiver, when the optical receiver associated with the first wavelength fails, includes receiving without notifying a far-side transceiver system and any components within a link between the plurality of optical receivers and the far-side transceiver.

18. A method, comprising:

replacing an optical receiver from a plurality of optical receivers with a backup optical receiver, when that optical receiver fails, without notifying the far-side transceiver and any components within a link between the plurality of optical receivers and the far-side transceiver; and defining a loopback path when a first optical switch and a second optical switch are activated, the first optical switch associated with the plurality of optical receivers and the backup optical receiver, the second optical switch associated with a plurality of optical transmitters.

19. The method of claim 18, wherein:

receiving, at each optical receiver from a plurality of optical receivers, at a unique wavelength from a plurality of wavelengths; and activating the backup optical receiver at a first wavelength from the plurality of wavelengths when the optical receiver from the plurality of optical receiver is associated with the first wavelength and fails.

20. The method of claim 18, wherein the optical transceiver system further has:

demultiplexing a plurality of optical signals, each optical signal from a set of optical signals from the plurality of optical signals being associated with an optical receiver from the plurality of optical receivers and not to the backup optical receiver; and tuning an optical filter to a first wavelength when the optical receiver from the plurality of optical receivers and associated with the first wavelength fails such that an optical signal from the plurality of optical signals is sent to the backup optical receiver.

21. The method of claim 18, further comprising:

receiving a plurality of receiver channel signals; and sending a receiver channel signal from the plurality of receiver channel signals and associated with a first wavelength to the backup optical transmitter and not the optical receiver associated with the first wavelength when the optical receiver associated with the first wavelength fails.

22. A method, comprising:

controlling a backup optical receiver so that the backup optical receiver is activated at a first wavelength when the optical receiver from the plurality of optical receivers and associated with the first wavelength fails; and activating (1) a first optical switch associated with a plurality of optical transmitters and (2) a second optical switch associated with the plurality of optical receivers and the backup optical receiver, such that the first optical switch and the second optical switch collectively configured to define a loopback path when the first optical switch and the second optical switch are activated.

23. The method of claim 22, further comprising:

sending a signal such that a plurality of receiver channel signals and a backup receiver channel signal is received when the optical receiver associated with the first wavelength fails.

24. The method of claim 22, wherein:

activating the backup optical receiver such that the backup optical receiver receives at the first wavelength, when the optical receiver associated with the first wavelength fails, without notifying a far-side transceiver and any components within a link between the plurality of optical receivers and the far-side transceiver.

* * * * *

UNITED STATES PATENT AND TRADEMARK OFFICE
CERTIFICATE OF CORRECTION

PATENT NO. : 9,350,445 B1
APPLICATION NO. : 14/834168
DATED : May 24, 2016
INVENTOR(S) : Theodore J. Schmidt et al.

Page 1 of 1

It is certified that error appears in the above-identified patent and that said Letters Patent is hereby corrected as shown below:

Claims

Column 15, line 14 (claim 3, line 8):

After "wavelength", delete "fails".

Signed and Sealed this
Twenty-third Day of August, 2016

Michelle K. Lee
*Director of the United States Patent and Trademark Office*